United States Patent
Fujihira et al.

(10) Patent No.: US 7,388,452 B2
(45) Date of Patent: Jun. 17, 2008

(54) INTEGRATED BRANCHING NETWORK SYSTEM AND JOINT CONNECTOR

(75) Inventors: Katsuya Fujihira, Shizuoka (JP); Sayaka Aoshima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 122 days.

(21) Appl. No.: 11/165,343

(22) Filed: Jun. 24, 2005

(65) Prior Publication Data
US 2006/0062239 A1  Mar. 23, 2006

(30) Foreign Application Priority Data
Jun. 25, 2004  (JP) .............................. 2004-187878

(51) Int. Cl.
*H01P 5/12* (2006.01)
*H03H 7/38* (2006.01)

(52) U.S. Cl. ...................... 333/125; 333/124; 370/438

(58) Field of Classification Search ........ 333/124–128, 333/100; 370/438
See application file for complete search history.

(56) References Cited

U.S. PATENT DOCUMENTS

| | | | |
|---|---|---|---|
| 3,832,647 A * | 8/1974 | Beurrier ...................... 330/286 |
| 4,475,191 A | 10/1984 | James et al. |
| 5,787,367 A * | 7/1998 | Berra ............................. 701/1 |
| 5,982,192 A * | 11/1999 | Saito ........................... 326/30 |
| 6,449,308 B1 | 9/2002 | Knight, Jr. et al. |
| 6,503,098 B2 * | 1/2003 | Aoki et al. .................. 439/502 |
| 6,621,371 B2 * | 9/2003 | Lee .............................. 333/33 |
| 6,680,623 B2 * | 1/2004 | Hirai et al. ................... 326/30 |
| 6,744,332 B2 * | 6/2004 | Bois et al. .................. 333/125 |
| 2003/0110454 A1 | 6/2003 | Liaw et al. |
| 2003/0210067 A1* | 11/2003 | Miller ........................ 324/765 |

FOREIGN PATENT DOCUMENTS

| EP | 1 309 043 A2 | 5/2003 |
|---|---|---|
| WO | WO 00/70474 | 11/2000 |

OTHER PUBLICATIONS

European Search Report dated Oct. 6, 2006.

* cited by examiner

*Primary Examiner*—Barbara Summons
(74) *Attorney, Agent, or Firm*—Finnegan, Henderson, Farabow, Garrett & Dunner, L.L.P.

(57) ABSTRACT

A network system is provided with a joint connector for branching a communication line to plural lines respectively linked with plural nodes, the joint connector is provided with terminals for respectively linking with plural nodes, and circuits respectively having characteristic impedances, the circuits respectively linking adjacent pairs of the terminals.

9 Claims, 3 Drawing Sheets

INTEGRATED BRANCHING NETWORK SYSTEM AND JOINT CONNECTOR

BACKGROUND OF THE INVENTION

1. Field of the Invention

The present invention in general relates to an integrated branching network system and a joint connector used therein, and in particular relates to an art for reduction of distortions of a waveform at the joint connector.

2. Description of the Related Art

Vehicles are these days equipped with network systems for communication of signals for controlling various electronic equipments. Such a network system is typically provided with a main line and a plurality of nodes and branching points linking the nodes with the main line. Japanese Patent Application Laid-open No. 2000-151153 discloses an art of the network system. In these network systems, distortions of waveforms of data signals are investigated in certain cases and often cause occurrence of data errors.

SUMMARY OF THE INVENTION

The inventors had found out that particular branching points to which plural branch nodes are centralized and connected cause considerable impedance mismatches, which lead to the distortions of the waveforms. The present invention was accomplished in view of the finding and is intended for providing an integrated branching network system and a joint connector used therein, which reduces the data errors by dispersing the distortions of the waveform.

According to a first aspect of the present invention, a network system is provided with a joint connector for branching a communication line to plural lines respectively linked with plural nodes, the joint connector is provided with terminals for respectively linking with plural nodes, and circuits respectively having characteristic impedances, the circuits respectively linking adjacent pairs of the terminals.

According to a second aspect of the present invention, a joint connector for branching a communication line to plural lines respectively linked with plural nodes, the joint connector is provided with: terminals for respectively linking with plural nodes; and circuits respectively having characteristic impedances, the circuits respectively linking adjacent pairs of the terminals.

Since the circuits respectively having characteristic impedances intervene between the respective adjacent terminals, occurrence of a considerable extent of distortion at the branching points can be prevented and hence reliability of data transmission can be ensured.

Preferably, each of the circuits consists of a conductor. Alternatively preferably, each of the circuits is provided with an LC circuit so configured as to be equivalent to the communication line.

The above constituted circuits lead to reduction of distortion of the waveform and reliable data transmission.

DETAILED DESCRIPTION OF THE PREFERRED EMBODIMENT

A first embodiment of the present invention will be described hereinafter with reference to FIGS. 1 to 3. A network system in accordance with the first embodiment is provided with plural nodes (eight nodes in this illustration) 1-1 to 1-8 and a communication line 2 for linking the nodes 1-1 to 1-8. These nodes are for example respective ECUs (Electronic Control Unit).

Each of the communication line 2 is provided with a main line 2a, joint connectors (J/C) 3a and 3b, and plural branch lines 2b respectively connected with the joint connectors 3a and 3b (four branch lines with each J/C). Nodes 1 are respectively connected with the branch lines 2b.

The joint connectors 3a and 3b are provided with terminals T1 to T4 and T5 to T8, which are respectively connected with the nodes 1-1 to 1-4 or 1-5 to 1-8 via the branch lines 2b. The adjacent terminals T1 to T4 and T5 to T8 are interlinked via conductors 11 (circuits having characteristic impedances). The conductors 11 are for example serpentinely patterned conductors formed on a substrate, which respectively have a length of X m.

Figure 1:
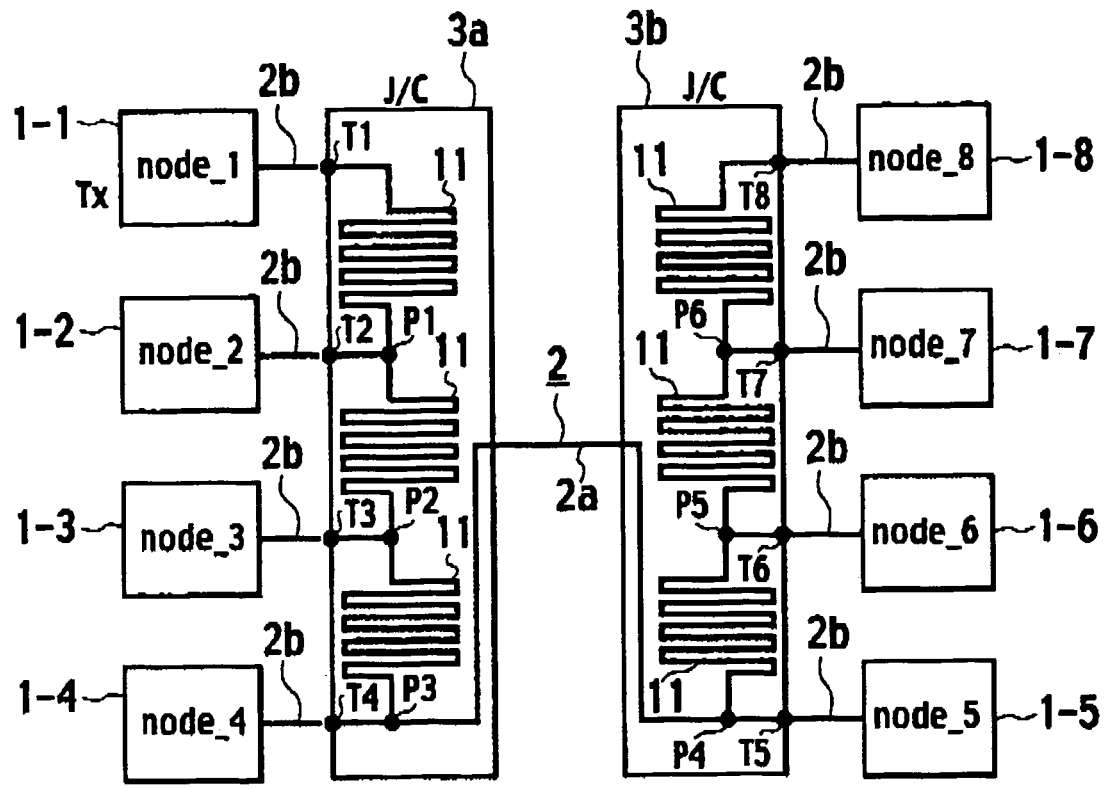
FIG. 1 is a block diagram of an integrated branching network system in accordance with a first embodiment of the present invention.
Figure 2:
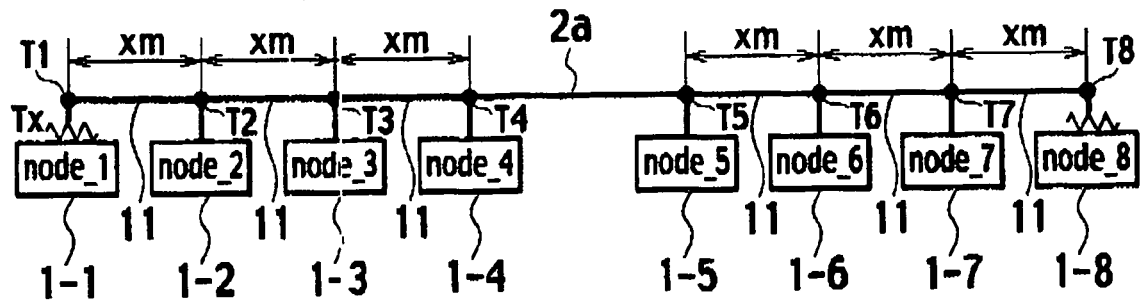
FIG. 2 is a block diagram of an equivalent circuit of the network system with respect to a portion housed in a joint connector shown in FIG. 1.
Figure 3:
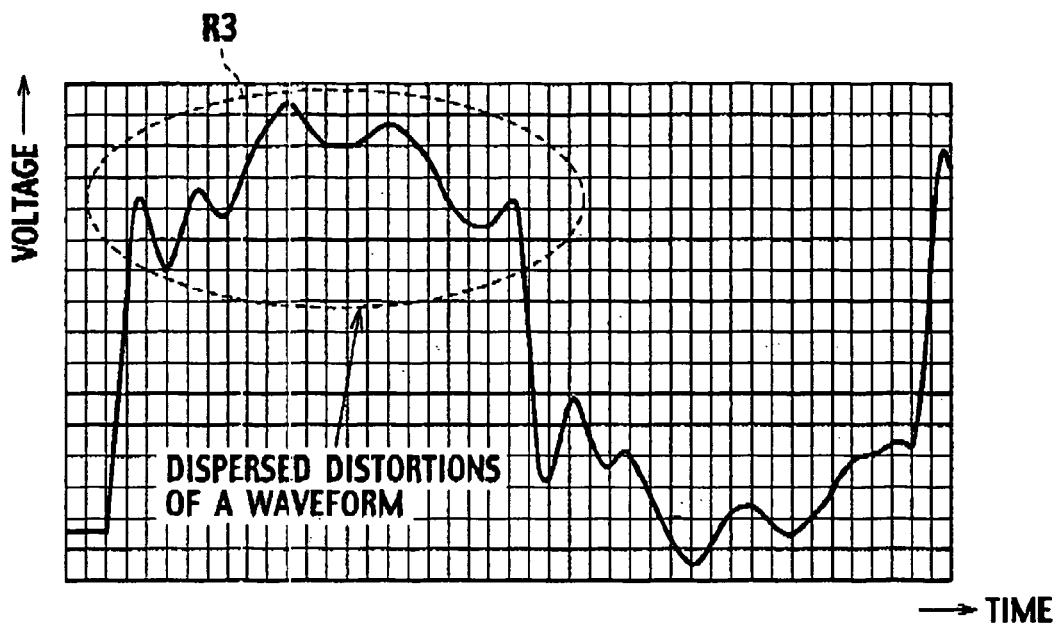
FIG. 3 is a graph illustrating distortions of a waveform occurring in a transmitting signal.

The network system illustrated in FIG. 1 can be represented by an equivalent circuit shown in FIG. 2. The nodes 1-1 to 1-4 and the nodes 1-5 to 1-8 are respectively interlinked via the conductors 11 being X m in length. The characteristic impedances of the conductors 11 respectively intervene between the adjacent nodes 1.

Operations of the aforementioned integrated branching network system will be described hereinafter. Suppose that the node 1-1 transmits a data, a data signal is subject to distortion of a waveform thereof caused by an impedance mismatching at a branching point P1 in the joint connector 3a. In a similar way, the data signal is in succession subject to distortion at branching points P2 and P3 and further branching points P4 to P6 in the joint connector 3b. Meanwhile, "Tx" denoted at the node 1-1 in FIGS. 1 and 2 means that the node functions as a transmitter.

Since plural nodes are not centralized to a particular branching point but dispersedly connected to the branching points P1 to P6, characteristic impedance is not extremely changed and hence extents of the distortions are prominently decreased. More specifically, distortions of the waveform are dispersed as shown in FIG. 3 because of the dispersed disposition of branching points P1 to P6 and, instead, extents of the distortions are decreased as compared with the case of the centralized branching point. Thereby occurrence of errors in the transmitted data is effectively prevented.

As described above, since the integrated branching network system in accordance with the present embodiment has the constitution in which both ends of the main line 2a respectively have the joint connectors 3a and 3b and the conductors 11 having characteristic impedances intervenes the adjacent terminals T1 to T4 and T5 to T8 respectively included in the joint connectors 3a and 3b, the distortions occurred in the transmitted signal are not centralized but dispersed and hence occurrence of extreme distortions are prevented. Thereby reliability of data transmission can be ensured.

Figure 4:
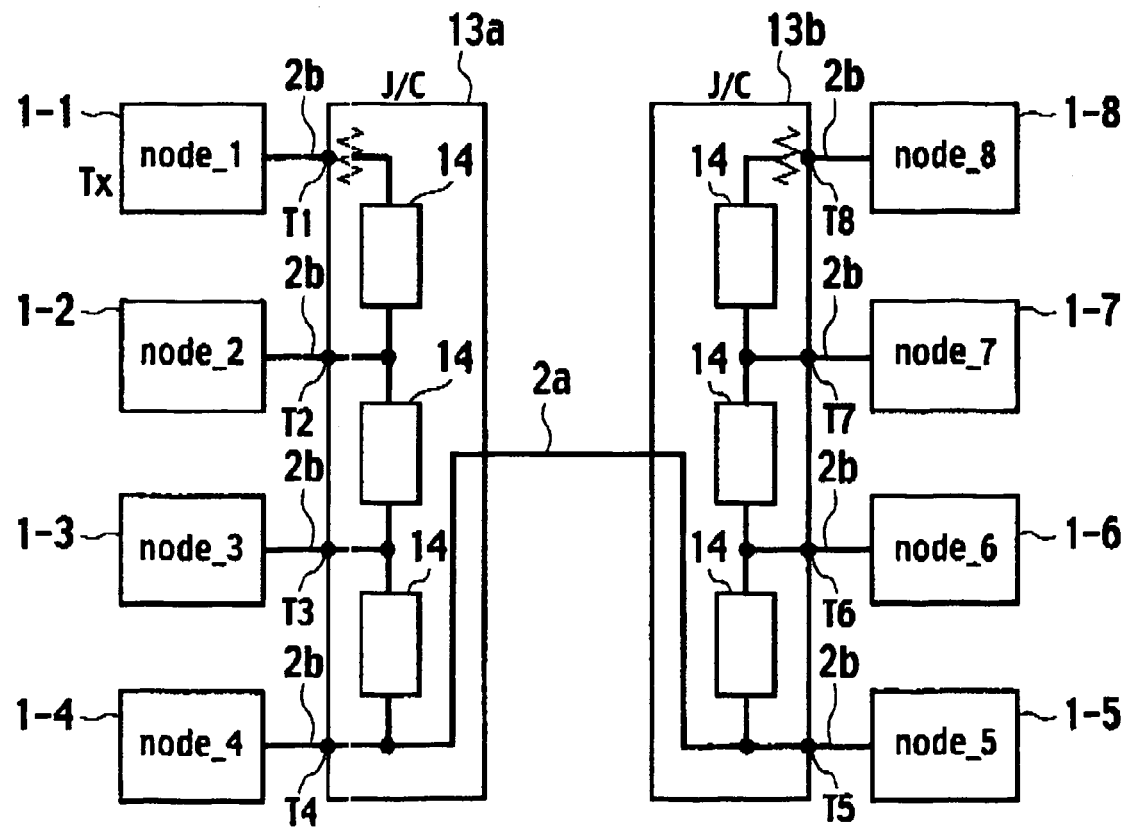
FIG. 4 is a block diagram of an integrated branching network system in accordance with a second embodiment of the present invention.
Figure 5:
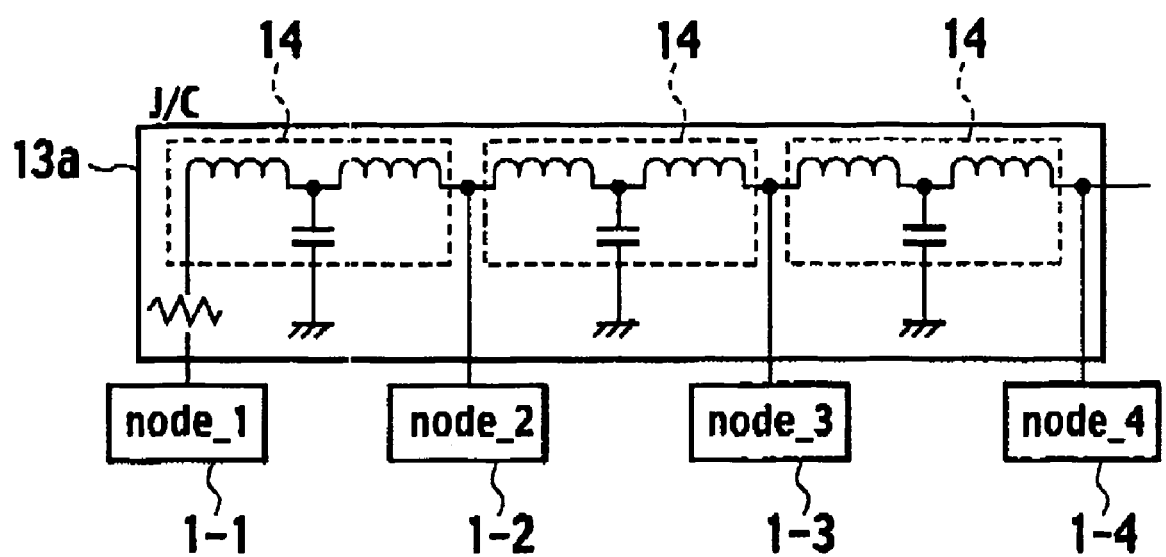
FIG. 5 is a block diagram of an equivalent circuit of the network system with respect to a portion housed in a joint connector shown in FIG. 4.

Next, a second embodiment of the present invention will be described hereinafter with reference to FIGS. 4 and 5. As compared with the aforementioned first embodiment, the present embodiment differs in constitutions of the joint connectors and the other parts are substantially identical thereto. Joint connectors 13a and 13b and respective nodes 1-1 to 1-8 connected therewith in accordance with the second embodiment are constituted as shown in FIG. 4.

The nodes 1-1 to 1-4 and the nodes 1-5 to 1-8 are respectively interlinked via equalizing circuits 14, whose characteristic impedances are equivalent to the characteristic impedances of the branch lines 2b. FIG. 5 illustrates a constitution of the circuit in the joint connector 13a in further detail. As shown therein, each of the equalizing circuits 14 is composed of an LC impedance circuit, which consists of inductance coils and a capacitor. The illustrated circuit between the terminals T1 to T4 of the joint connector 13a is so formed to be equivalent to the bus-type circuit shown in FIG. 2. Therefore, the distortion of the waveform is prominently suppressed and reliability of data transmission can be ensured.

Although the invention has been described above by reference to certain embodiments of the invention, the invention is not limited to the embodiments described above. Modifications and variations of the embodiments described above will occur to those skilled in the art, in light of the above teachings.

For example, the number of the joint connectors is not limited to be two as the above embodiments and can be modified to be one, three or more.

Moreover, the aforementioned networks can be applied to not only vehicles but also the other communication systems.

What is claimed is:

1. A network system comprising:
   a joint connector for branching a communication line to plural lines respectively linked with plural nodes, the joint connector comprising terminals for respectively linking with plural nodes, and
   circuits respectively having characteristic impedances, the circuits respectively linking each adjacent pair of the terminals,
   wherein the circuits are connected in series, thereby reducing changes to the characteristic impedances thereof.

2. The network system of claim 1, wherein each of the circuits comprises a conductor.

3. The network system of claim 2, wherein the lengths of the conductors are equal.

4. The network system of claim 1, wherein each of the circuits comprises an LC circuit so configured as to be equivalent to the communication line.

5. The network system of claim 1, wherein the nodes include electronic equipment installed in a vehicle and the communication line is a communication line for a network for the vehicle.

6. A joint connector for branching a communication line to plural lines respectively linked with plural nodes, the joint connector comprising:
   terminals for respectively linking with plural nodes; and
   circuits respectively having characteristic impedances, the circuits respectively linking each adjacent pair of the terminals,
   wherein the circuits are connected in series, thereby reducing changes to the characteristic impedances thereof.

7. The joint connector of claim 6, wherein each of the circuits comprises a conductor.

8. The joint connector of claim 7, wherein the lengths of the conductors are equal.

9. The joint connector of claim 6, wherein each of the circuits comprises an LC circuit so configured as to be equivalent to the communication line.

* * * * *